United States Patent
Stöwe et al.

(10) Patent No.: US 6,619,736 B2
(45) Date of Patent: Sep. 16, 2003

(54) VEHICLE SEAT VENTILATION SYSTEM

(75) Inventors: Stefan Stöwe, Mering (DE); Matthias Pietsch, Königslutter (DE); Matthias Michniacki, Wolfsburg (DE)

(73) Assignee: W.E.T. Automotive Systems AG, Odelzhausen (DE)

( * ) Notice: Subject to any disclaimer, the term of this patent is extended or adjusted under 35 U.S.C. 154(b) by 4 days.

(21) Appl. No.: 09/791,362

(22) Filed: Feb. 23, 2001

(65) Prior Publication Data

US 2001/0028185 A1 Oct. 11, 2001

(30) Foreign Application Priority Data

Feb. 26, 2000 (DE) .......................... 100 09 128

(51) Int. Cl.⁷ ................................. B60N 2/56
(52) U.S. Cl. ............................ 297/180.14; 297/180.13; 5/652.2
(58) Field of Search .................... 297/180.12, 180.13, 297/180.14; 62/3.61, 261; 5/423, 726, 652.2; 454/120, 907

(56) References Cited

U.S. PATENT DOCUMENTS

| 5,902,014 A | 5/1999 | Dinkel et al. |
| 5,934,748 A | 8/1999 | Faust et al. |
| 6,186,592 B1 * | 2/2001 | Orizaris et al. ........ 297/180.12 |

* cited by examiner

Primary Examiner—Peter R. Brown

(57) ABSTRACT

A vehicle seat ventilating system comprising at least one fan (4) arranged in the seat (7) and controlled by a central control unit (1) and an electric control unit (3) associated with each fan (4) for actuating the respective fan in response to control signals from the central control unit (1), wherein each electronic control (3) is arranged at the respective fan (4) Thus, each of the fans (4) arranged in the vehicle seat (7) has its own electronic control unit (3) that is located at the fan (4) and is connected to the central seat control unit (1) by a data line (2) that transmits control signals. The power supply currents required to drive the fan (4) are regulated directly in the electronic control unit (3) located at the respective fan (4). Thus, each of the fans (4) arranged in the vehicle seat (7) has its own electronic control unit (3) located at the fan (4) and is connected to the central seat control unit (1) by a data line (2) that transmits control signals. In this way, the number of fan units controlled by the central control unit (1) can be readily changed according to design criteria as a result of the standard data bus interface.

18 Claims, 1 Drawing Sheet

VEHICLE SEAT VENTILATION SYSTEM

This application claims the priority of DE 100 09 128.8 filed Feb. 26, 2000 and entitled Vehicle Seat Ventilating System.

BACKGROUND OF THE INVENTION

The invention relates generally to a device for ventilating a vehicle seat and, more particularly, concerns a fan-ventilated seat controlled by a central seat control unit.

Ventilated vehicle seats serve to improve seat comfort. Optimum temperature distribution within the vehicle seat can be achieved by means of one or more fans arranged in the vehicle seat, and ventilation can also be used to avoid seat overheating resulting from direct exposure to sunlight. As used herein, the term "seat" or "seating surface" or "seating ventilation" is intended to include both seats in the narrow sense and seat back rests or supports.

U.S. Pat. No. 5,902,014 describes a vehicle seat equipped with a ventilation layer on the upholstery covering of the vehicle seat. A plurality of electrically driven miniature fans integrated in the upholstery covering, which can be switched on and off by the seat user, are provided in order to ventilate the ventilation layer.

U.S. Pat. No. 5,934,748 describes a vehicle seat with a central control unit for the actuation of fans arranged in the vehicle seat. The central control unit operates as a function of the upholstery surface temperature in order to switch the fans to the appropriate power level.

The foregoing systems have drawbacks in that they are highly customized for each particular application. Furthermore, because all fans are controlled from a central unit, interference in the transmission lines connecting the fans to the central control unit can degrade the overall system performance. Accordingly, there exits a need for a vehicle seat ventilation system having improved communication integrity and a standardized, and hence readily scalable, architecture.

SUMMARY OF THE INVENTION

Accordingly, an object of the present invention is to provide a device for ventilating a vehicle seat having simplified architecture and a high degree of integrity in the communication pathways between the fans arranged in the vehicle seat and the central seat control unit.

According to one embodiment of the present invention, the foregoing and other objects and advantages are attained by a vehicle seat ventilating system comprising at least one fan arranged in the seat and controlled by a central control unit and an electric control unit associated with each fan for actuating the respective fan in response to control signals from the central control unit, wherein each electronic control is arranged at the respective fan. Thus, each of the fans arranged in the vehicle seat has its own electronic control unit that is located at the fan and is connected to the central seat control unit by a data line that transmits control signals. The power supply currents required to drive the fan are regulated directly in the electronic control unit located at the respective fan.

An advantage of the present invention is that the electronic control unit located at the fan can be electromagnetically shielded in a very simple manner. Preferably this is accomplished by enclosing the electronic control unit in a metallic or metallized fan housing. Another advantage is that the data line leading to the fans carries only very low currents. As a result, the data line emits no significant interfering fields. In addition, the device in accordance with the invention has the advantage that, in accordance with the specific requirements, the data line can be connected to more or fewer fans, each of whose electronic control units can be addressed via the data line.

A further advantage of the present invention is that, the standard equipment of a motor vehicle can have a central seat control unit that is ready for connection to a data line leading to the fans. The standard equipment of the vehicle can then be expanded without difficulty in that fans, whose associated electronic control units need only be connected to the central seat control unit via a data line, are built into the driver's seat or other vehicle seats as desired. Each fan with its electronic control unit then only needs to be connected to the on-board voltage supply.

The electronic control unit arranged at the fan can in each case serve as a serial interface between the fan drive and the central seat control unit.

The data line between the central seat control unit and the electronic control unit is preferably designed as a bidirectional data bus that is capable not only of transmitting control signals to the electronic control unit of the fan, but also communicate data on-operating conditions and data on the temperature of the transported air to the central seat control unit. Based on the data received, the central seat control unit can operate the individual fans or perform a fault diagnosis on the individual fans.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should now be made to the embodiments illustrated in greater detail in the accompanying drawings and described below by way of an example of the invention.

In the drawings.

DETAILED DESCRIPTION OF THE INVENTION

Figure 1:
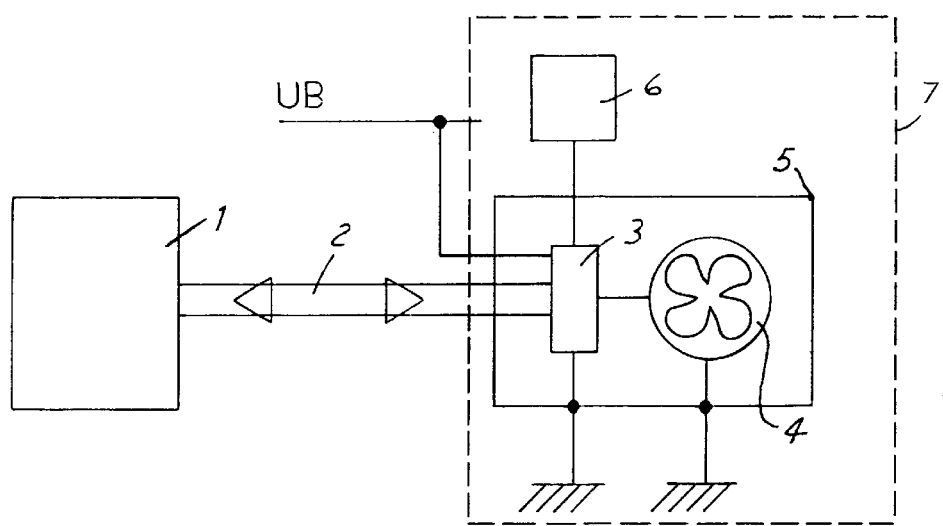
FIG. 1 is a schematic block diagram of one embodiment of a vehicle ventilation system according to the present invention.

Referring now to FIG. 1, there is shown a schematic block diagram of a system for ventilating a vehicle seat 7. The system includes a central seat control unit 1 and a fan 4 with an electronic control unit 3 arranged in the fan housing 5.

The central seat control unit 1 is connected by a bidirectional data line 2 to the electronic control unit 3, whose outputs actuate the drive for the fan 4. Preferably, the data line 2 is a serial communication bus. A metallic fan housing 5 electromagnetically shields the electronic control unit 3 and the fan 4. Alternatively, the fan housing 5 can be metallized to achieve similar electromagnetic shielding properties.

The electronic control unit 3 receives its supply voltage from the on-board voltage supply UB. Control signals with very low current levels are transmitted over the data line 2, so that the data line 2 emits no undesirable interfering fields.

The electronic control unit 3 constitutes an interface between the drive for the fan 4 and the central seat control unit 1 and can communicate temperature data from a temperature sensor 6 as well as other data on operating conditions to the central seat control unit 1. In the seat control unit 1, optimization of the fan operation and execution of fault diagnosis can be performed using the received data on operating conditions.

Figure 2:
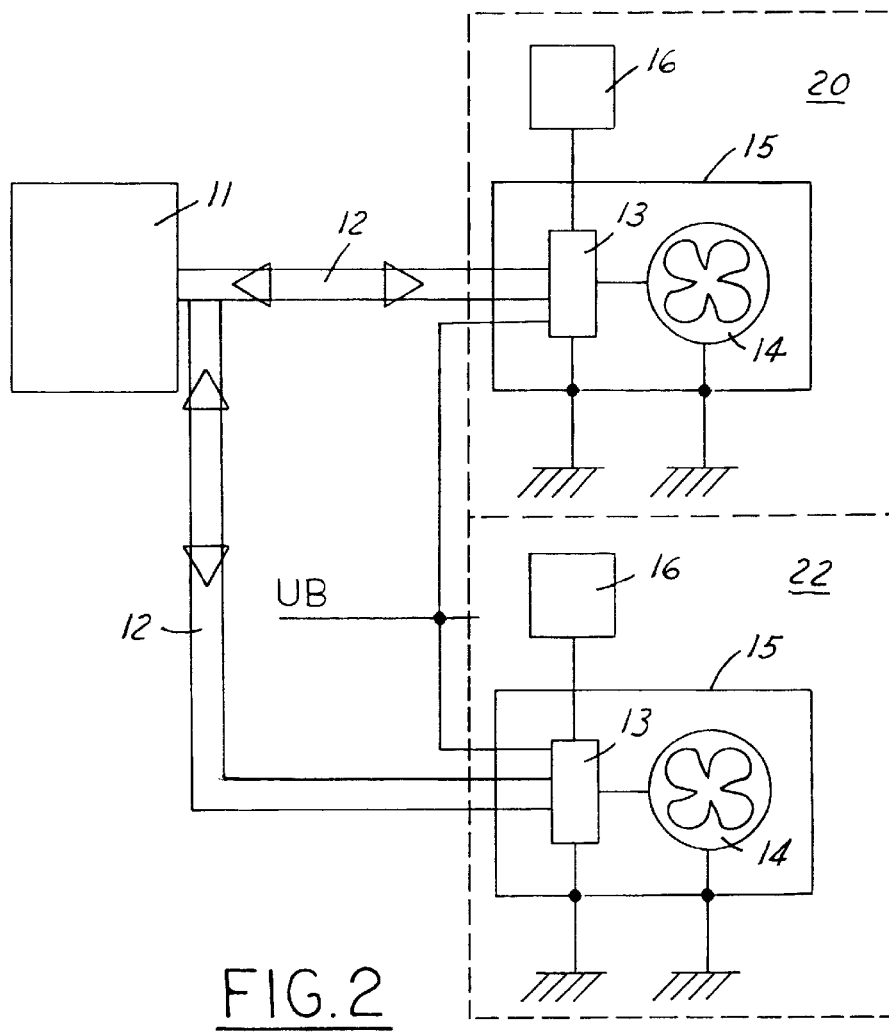
FIG. 2 is a schematic block diagram of another embodiment of a vehicle ventilation system according to the present invention.

Referring now to FIG. 2, there is shown a schematic block diagram of another embodiment of a vehicle ventilation system according to the present invention. In the example of FIG. 2, two fan units 14 are shown connected by the bidirectional data line 12 to the central seat control unit 11. Each fan unit 4 is arranged in a respective vehicle seat portion 20, 22. Each seat portion represents a zone of the vehicle seat where ventilation is desired. Either or both seat portions 20, 22 may be located in the vehicle seat bottom or back rest.

Each fan unit 14 is activated by its respective electronic control unit 13. Each electronic control unit 13 is powered by the on-board voltage supply UB. Preferably, each electronic control unit is also arranged within its respective fan housing 15 which is metallic or metallized to electromagnetically shield the electronic control unit 13 and respective fan 14.

Climate sensors 16 are in operative communication with the central seat control unit 11 by way of respective electronic control units 13. Although two climate sensors 16 are shown in the example of FIG. 2, the system could utilize one climate sensor shared between the two electronic control units 13 or additional climate sensors as dictated by performance and seat design criteria. Climate sensors 16 comprise temperature sensors, humidity sensors or the like to provide an indication of the operator climate environment. In an alternative arrangement, climate sensors 16 may be connected directly to the central seat control unit 11.

From the foregoing, it can be seen that there has been brought to the art a new and improved seat ventilation system. While the invention has been described in connection with one or more embodiments, it should be understood that the invention is not limited to these embodiments. For example, the central seat control unit may be contained within the seat portions or be external to such seat portions as shown. Accordingly, the invention covers all alternatives, modifications and equivalents as may be included within the spirit and scope of the appended claims.

What is claimed is:

1. A vehicle seat ventilating system comprising:
   at least one fan arranged in a seat; and
   a corresponding electronic control unit electronically connected to each fan and including independent drive electronics for actuating the respective fan in response to a control signal from a central control unit, wherein each electronic control unit is arranged at the respective fan and is electrically communicating with the central control unit by way of a low power data line for transmitting said control signal such that each electronic control unit can be electrically isolated from the operating environment of the central control unit.

2. The vehicle seat ventilating system of claim 1 wherein each electronic control unit forms a serial interface between each respective fan and the central control unit.

3. The vehicle seat ventilating system of claim 1 wherein said data line is a bidirectional data line adapted to transmit said control signal to said respective electronic control unit and transmit fan operating data to said central control unit.

4. The vehicle seat ventilating system of claim 1 wherein said data line is a bidirectional data line adapted to transmit said control signal to said respective electronic control unit and transmit operator environment data to said central control unit.

5. The vehicle seat ventilating system of claim 1 wherein each electronic control unit is arranged within a fan housing of its respective fan.

6. The vehicle seat ventilating system of claim 5 wherein said fan housing is electromagnetically shielded.

7. A vehicle seat ventilating system comprising:
   at least on fan arranged in a seat;
   a corresponding electronic control unit electrically connected to each fan for actuating the respective fan in response to a control signal from a central control unit, wherein each electronic control unit is arranged at the respective fan and is electrically communicating with the central control unit by way of a low power data line for transmitting said control signal such that each electronic control unit can e electrically isolated from the operating environment of the central control unit; and
   a climate sensor in operative communication with at least one of the electronic control units for communicating operator climate data to the central control unit.

8. A system comprising:
   a vehicle seat having a seat portion and a back rest portion;
   a central control unit proximate the vehicle seat;
   at least open fan arranged in the seat portion of the vehicle seat; and
   a corresponding electronic control unit connected to each fan and electrically communicating with said central control unit for actuating the respective fan in response to a low power control signal from the central control unit, wherein each electronic control unit is arranged at the respective fan and includes independent drive electronics for the respective fan such that each electronic control unit can be electrically isolated from the operating environment of the central control unit.

9. The system of claim 8 comprising at least one fan arranged in the back rest portion of the vehicle seat and controlled by said central control unit.

10. The system of claim 8 wherein each electronic control unit is in operative communication with the central control unit by way of a bidirectional data line for transmitting said control signal to said respective electronic control unit and transmit fan operating data to said central control unit.

11. The system of claim 8 wherein each electronic control unit is arranged within an electromagnetically shielded fan housing of its respective fan.

12. A system comprising:
   a vehicle seat having a seat portion and a back rest portion;
   a central control unit proximate the vehicle seat; at least one fan arrange in the seat portion of the vehicle seat;
   a corresponding electronic control unit connected to each fan and electrically communicating with said central control unit for actuating the respective fan in response to a low power control signal from the central control unit, wherein each electronic control unit is arranged at the respective fan and includes independent drive electronics for the respective fan such that each electronic control unit can be electrically isolated from the operating environment of the central control unit; and
   a climate sensor in operative communication with at least one of the electronic control units for communicating operator climate data to the central control unit.

13. A system comprising:

a vehicle rat having a seat portion and a back rest portion;

a central control unit proximate the vehicle seat;

at least one fan arrange in the seat portion of the vehicle seat;

a corresponding electronic control unit connected to each fan and electrically communicating with said central control unit for actuating the respective fan in response to a low power control signal from the central control unit, wherein each electronic control unit is arranged at the respective fan and includes independent drive electronics for the respective fan such that each electronic control unit can be electrically isolated from the operating environment of the central control unit; and a climate sensor in operative communication with each electronic control unit for communicating operator climate data to the central control unit.

14. A system comprising:

a vehicle seat having a seat portion and a back rest portion;

a central control unit proximate the vehicle seat;

a first fan arranged in the seat portion of the vehicle seat;

a second fan arranged in the back rest portion of the vehicle seat;

first and second electronic control units each in electrical communication with said central control unit and electrically connected to the respective first and second fans for actuating each respective fan in response to a low power control signal from the central control unit, wherein each electronic control unit is arranged proximate its respective fan within a fan, housing and includes independent drive electronics for the respective fan such that each electronic control unit can be electrically isolated front the operating environment of the central control unit; and first and second climate sensors electrically communicating with each respective first and second electronic control units for communicating operator climate data to the central control unit.

15. The system of claim 14 wherein each electronic control unit is arranged within an electromagnetically shielded fan housing of its respective fan.

16. The system of claim 14 wherein each electronic control unit forms a serial interface between its respective fan and the central control unit.

17. The system of claim 14 wherein each electronic control unit is in operative communication with the central control unit by way of a data line for transmitting said control signal.

18. The system of claim 17 wherein said data line is a bidirectional data line.

\* \* \* \* \*